N. A. CUMMINGS.
GANG PLOW FOR TRACTORS.
APPLICATION FILED DEC. 17, 1920.

1,425,947.

Patented Aug. 15, 1922.
2 SHEETS—SHEET 2.

UNITED STATES PATENT OFFICE.

NORMAN A. CUMMINGS, OF DETROIT, MICHIGAN.

GANG PLOW FOR TRACTORS.

1,425,947. Specification of Letters Patent. Patented Aug. 15, 1922.

Application filed December 17, 1920. Serial No. 431,368.

*To all whom it may concern:*

Be it known that I, NORMAN A. CUMMINGS, citizen of the United States, residing at Detroit, county of Wayne, State of Michigan, have invented a certain new and useful Improvement in Gang Plows for Tractors, and declare the following to be a full, clear, and exact description of the same, such as will enable others skilled in the art to which it pertains to make and use the same, reference being had to the accompanying drawings, which form a part of this specification.

My invention relates to a gang-plow for tractors shown in the accompanying drawings and more particularly described in the following specification and claims.

It is well known that many fatalities occur in plowing with a tractor and that they are usually the result of the tractor overturning, due to the sudden stoppage of the plow upon encountering a stone or stump, which arresting the progress of the tractor, causes the latter to overturn thereby crushing the driver beneath its weight.

It is also well known that the plow itself is often wrecked or badly damaged through encountering a stone or stump when drawn by the tractor at a relatively high speed.

It is the object or purpose therefore of this invention to overcome these objections by constructing a gang-plow for tractors comprising a plural number of plow-shares respectively supported upon a series of beams hinged to a supporting frame;—the construction being such that in the event of any of the plow-shares encountering an obstruction its supporting beam will tilt thereby releasing the plow-share carried by the beam;—the plow share again entering the ground to cut a furrow upon passing the obstruction and without the necessity of stopping the tractor.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Referring now to the letters of reference placed upon the drawings:

A, denotes a main frame preferably constructed of channel iron provided with a suitable coupling B, connected by a draw-bar carried by the tractor—not shown.

C, C, are traction wheels for supporting the frame. D, is a diagonally arranged member bolted at each end to the underside of the frame A.

E, denotes a plural number of hinged beams pivoted to brackets F, bolted to the member D,—or to an extension F', of the plow beam, the extension being in turn bolted to the frame A.

G, indicates a diagonal member bolted at each end to the main frame on which the free end of the hinged plow beams rest. H, denotes a series of U-shaped members bolted to the member G which serves as guides for the respective hinged plow beams.

I, indicates an upstanding arm bolted to the end of each of the plow beams, provided at its upper end with a hook to receive the end link of a chain J, projecting downwardly therefrom and over pulleys K, and L;—the chain extending through an opening in the channel frame A, toward the front of the plow where it is connected with a spring M, which is in turn secured to the diagonal member D.

N, indicates a plural number of plows respectively carried on a supporting member N', bolted to the several beams. P, indicates the usual colter secured to the plow beam as at P', extending downwardly in front of the plow.

Q, denotes a rocking arm attached to the axles of the traction wheels, and R is a pin projecting through an opening in the frame for securing the free end of the rocking arm when adjusted;—the object being to provide means for raising the altitude of the frame whereby the the plow-share is freed from the ground when not in use.

This latter feature is common to gang-plows of the type shown and forms no part of this invention, and therefore requires no special description here,—it is shown merely to indicate a "means" for raising the plows from the ground when not in use.

Having now indicated the several parts by reference letters the construction and operation of the device will be readily understood.

Figure 1:
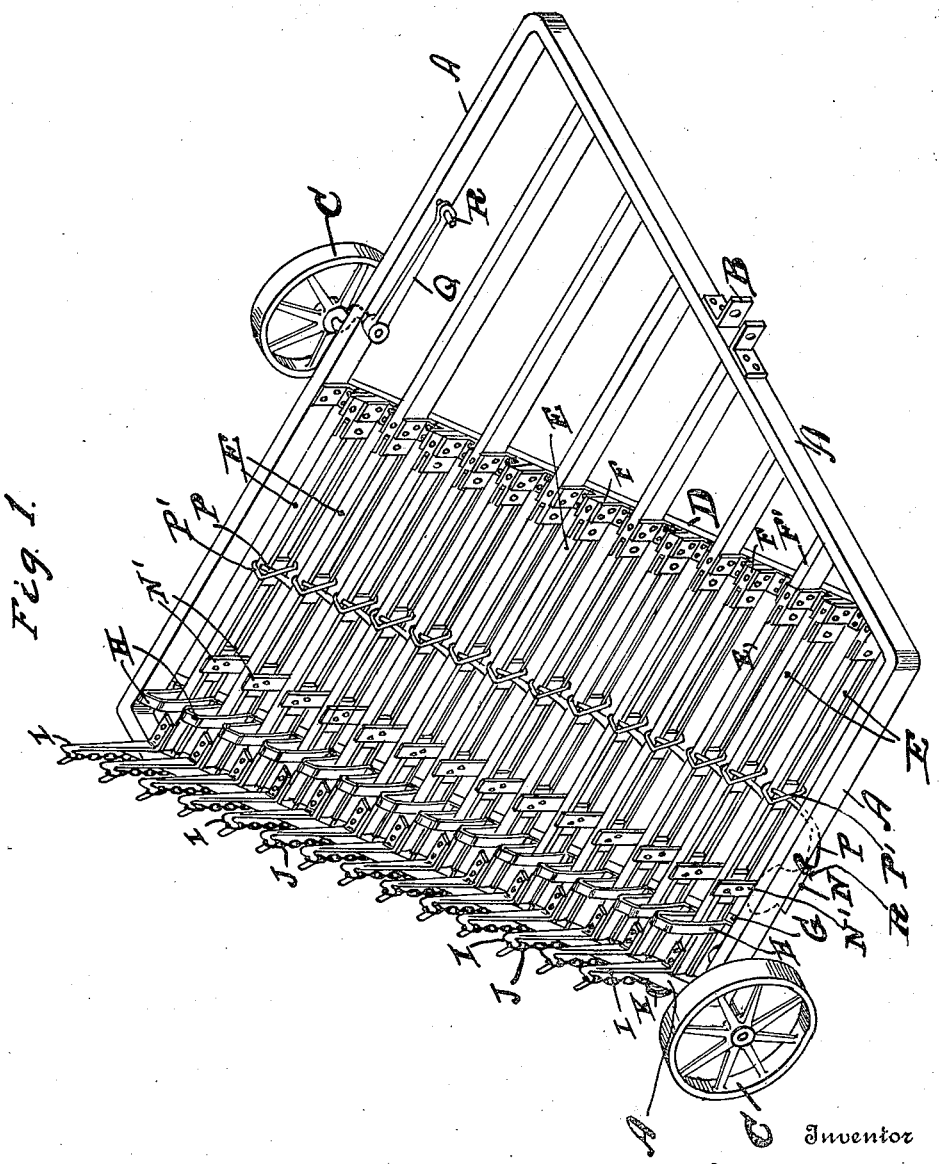
Figure 1 is a perspective view of a gang-plow embodying my invention.
Figure 2:
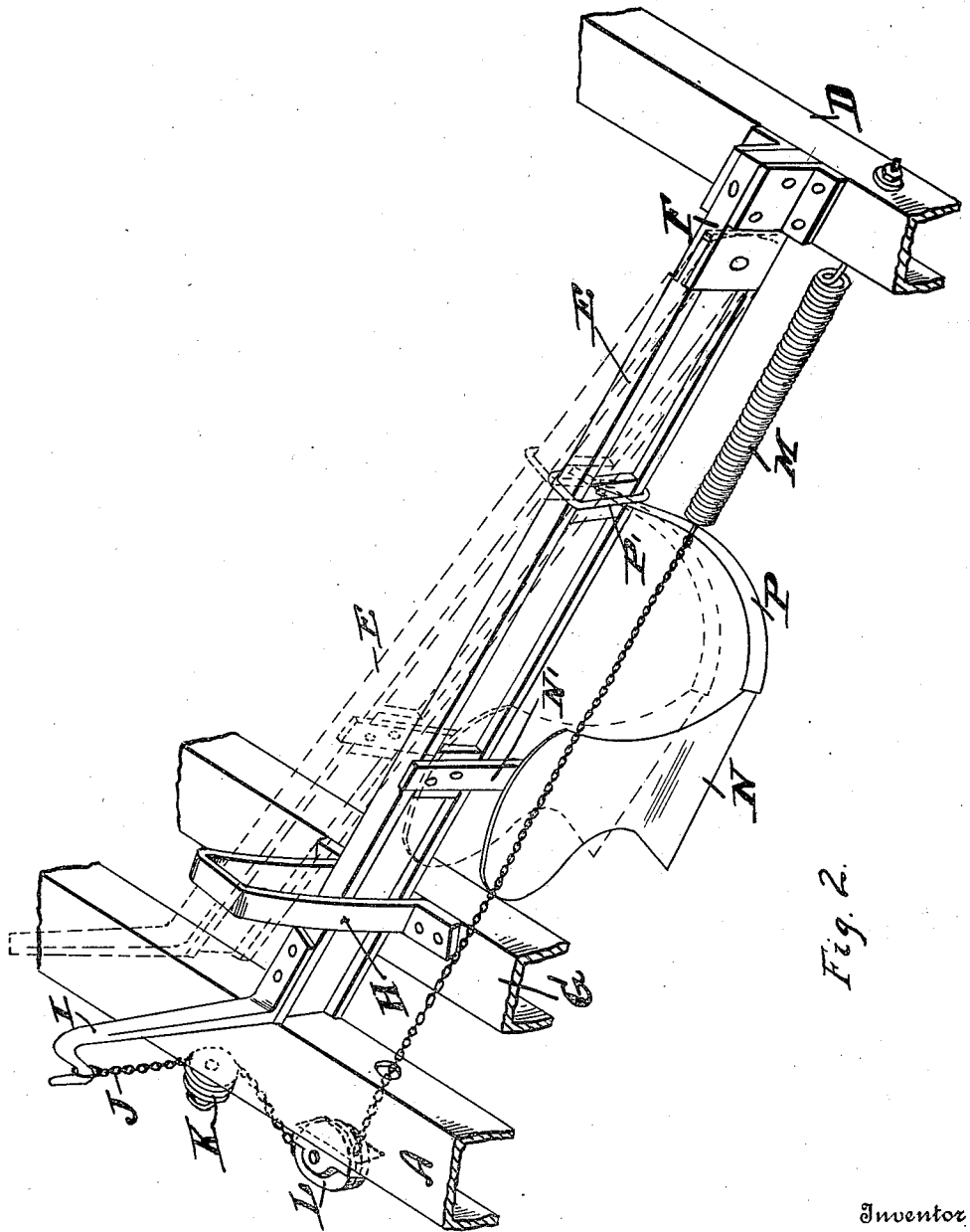
Figure 2 is an enlarged perspective view of a detail of the frame and one of the hinged plow beams, showing the plow-share attached thereto, and in dotted lines the plow-share with its supporting beam tilted as it would appear when freeing itself from an obstruction.

Upon any one of the plow-shares encountering an obstruction sufficient to resist the action of its spring employed to maintain it in its normal position, the beam will swing upwardly upon its pivot as indicated in dotted lines in Figure 2, thus tilting the plow-share that it may be freed from the obstruction. Upon the plow passing over the obstruction it will again enter the ground through the action of its spring to cut a furrow as before.

Having thus described my invention what I claim is:

1. In a gang plow, a frame, a plow beam supporting a plow share and hinged to the frame, means for supporting the free end of the plow beam, an arm provided with a hook at its upper end and bolted to the free end of said beam and extending upwardly from the latter, a spring connected at one end with the frame, a flexible element connected with the hook at the end of said arm and extending downwardly from said hook and connected with the spring, and a plurality of pulleys for guiding and supporting said flexible element whereby to support said plow beam in normal position.

2. In a gang plow, a frame, a plow beam supporting a plow share and hinged to the frame, means for supporting the free end of the plow beam, and provided with a hook at its upper end and bolted to the free end of said beam and extending upwardly from the latter, a spring connected at one end with the frame, a flexible element connected with the hook at the end of said arm and extending downwardly from said hook and connected with the spring, a plurality of pulleys for guiding and supporting said flexible element whereby to support said plow beam in normal position, and an inverted U-shaped guide member secured to the frame adjacent to the free end of the beam through which the beam projects.

3. In a gang-plow, a frame, a plurality of plow-beams each supporting a plow-share hinged to the frame, means for supporting the free ends of the plow-beams on a plane with each other, an arm provided with a hook at its upper end bolted to the free end of each of the plow-beams and extending upwardly from the latter, a plurality of springs connected at one end with the frame, a chain connected with the hook at the end of each of the arms carried by the plow-beams and extending downwardly from the respective hooks and connected with the springs, and a plurality of pulleys for guiding and supporting the several chains, whereby to support the plow beams in their normal position.

4. In a plow, a frame comprising a plurality of transverse members, a beam hingedly connected at one end to one of said members and supported on top of another thereof, an upwardly directed arm secured to the beam adjacent its free end terminating in a laterally extending hook, a third transverse member lying beneath the said hook and carrying guiding elements thereon, a spring secured to the first mentioned transverse member and a flexible member contacting with the said guiding elements and connecting the hook and spring whereby the beam is held in normal position.

5. In a plow comprising a frame, a beam hingedly connected thereto at one end and supported by the frame at its free end, a plow on the said beam, a rigid coulter secured to and movable with the beam adjacent the said plow, and terminating in close proximity to the plow point and in substantially the same plane therewith and presenting its curved face to the direction of travel of the plow, a spring connected to the frame, an upwardly extending arm secure to the free end of the beam and a flexible element passing through the frame and connecting the said arm and spring whereby the beam is held in normal position.

In testimony whereof, I sign this specification in the presence of two witnesses.

NORMAN A. CUMMINGS.

Witnesses:
L. E. THOMAS,
JOSEPH A. ROSENBERGER.